(12) United States Patent
Deppe et al.

(10) Patent No.: US 7,273,284 B2
(45) Date of Patent: Sep. 25, 2007

(54) IMAGE PROJECTOR WITH INTENSITY-CONTROLLED LIGHT SOURCE

(75) Inventors: Carsten Deppe, Aachen (DE); Holger Mönch, Vaals (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 242 days.

(21) Appl. No.: 10/531,016

(22) PCT Filed: Oct. 7, 2003

(86) PCT No.: PCT/IB03/04385

§ 371 (c)(1),
(2), (4) Date: Apr. 12, 2005

(87) PCT Pub. No.: WO2004/036922

PCT Pub. Date: Apr. 29, 2004

(65) Prior Publication Data

US 2006/0033888 A1    Feb. 16, 2006

(30) Foreign Application Priority Data

Oct. 17, 2002    (DE) ................................ 102 48 376

(51) Int. Cl.
*G03B 21/14* (2006.01)
(52) U.S. Cl. .............................. 353/85; 353/97; 353/34
(58) Field of Classification Search .................. 353/20, 353/31, 33, 34, 37, 122, 85, 97; 349/5, 7, 349/8, 9
See application file for complete search history.

(56) References Cited

U.S. PATENT DOCUMENTS

| 5,276,523 A | * | 1/1994 | Kurematsu et al. .......... 348/745 |
|---|---|---|---|
| 5,548,347 A | | 8/1996 | Melnik et al. |
| 6,082,865 A | * | 7/2000 | Yamazaki .................... 353/122 |
| 6,422,704 B1 | * | 7/2002 | Gyoten et al. .............. 353/122 |
| 7,090,356 B2 | * | 8/2006 | Koide ........................... 353/85 |
| 2005/0094110 A1 | * | 5/2005 | Nakamura .................... 353/85 |
| 2005/0110958 A1 | * | 5/2005 | Schwartz et al. ............. 353/85 |
| 2006/0170880 A1 | * | 8/2006 | Dambach et al. ............. 353/84 |
| 2006/0274286 A1 | * | 12/2006 | Morejon et al. ............... 353/85 |
| 2006/0279710 A1 | * | 12/2006 | Tani ............................ 353/85 |
| 2006/0290901 A1 | * | 12/2006 | Moriyama et al. ............ 353/97 |
| 2007/0008501 A1 | * | 1/2007 | Yamazaki et al. ............ 353/97 |

FOREIGN PATENT DOCUMENTS

| DE | 101 36 474 A1 | 2/2003 |
|---|---|---|
| DE | 102 20 510 A1 | 7/2003 |
| JP | 200028988 A | 1/2000 |

* cited by examiner

*Primary Examiner*—William C. Dowling

(57) ABSTRACT

A projection system for image representation includes a display, a lamp, and a sensor for generating a sensor signal for monitoring and compensating changes in the luminous flux provided by the lamp. To achieve a monitoring of the light quantity actually incident on the display, an optical component is arranged in a light path between the lamp and the display. The optical component allows a first light component to pass through and reflects a second light component such that one of the light components is directed at the display and the other light component is directed at the sensor arranged outside the light path. A sensor signal generated in this manner renders it possible to compensate for fluctuations in the luminous flux provided by the lamp through the control of a lamp driver in an effective.

12 Claims, 2 Drawing Sheets

IMAGE PROJECTOR WITH INTENSITY-CONTROLLED LIGHT SOURCE

The invention relates to a projection system for image representation with a display, at least one lamp, and at least one sensor for generating a sensor signal for the detection and compensation of changes in the luminous flux provided by said at least one lamp.

The light sources used in projection systems are usually formed by one or several high-pressure gas discharge lamps (HID [high intensity discharge] lamps or UHP [ultra high performance] lamps). These lamps may be operated with direct current as well as with alternating current in principle. Both modes of operation have their advantages and disadvantages. An alternating current can prevent a fast erosion of the electrodes and can raise the efficacy of the lamp, but the arc discharge is often unstable owing to the polarity change, so that periodic brightness fluctuations or other image interferences may arise. With a DC-operated lamp, however, it cannot be excluded either that instabilities of the arc discharge arise, in particular as the period of operation increases, for example owing to irregularities in the electrode distance that have arisen during that period, which instabilities may manifest themselves in particular in the form of arc jumping.

To safeguard an optimum and interference-free image quality throughout the operational life of a discharge lamp, therefore, sensors are preferably provided for monitoring the generated luminous flux and for compensating short-term fluctuations correspondingly in both modes of operation.

Fluctuations in the generated luminous flux may become apparent in a particularly unpleasant manner in color projection displays operating with time-sequential color rendering methods when one of the primary colors is shown with a different brightness than the other primary colors, or when its brightness in certain image regions differs from the brightness in other image regions.

Two time-sequential color rendering methods are distinguished and used in particular nowadays.

In a first method, the color image is generated by a sequential representation of full pictures in the three primary colors ("field sequential color") and possibly of a fourth, white image on the display. This method is used, for example, in most DLP (digital light processing) projectors nowadays.

In a second method, the color image is generated in that all primary colors run over the display one after the other in the form of color beams or color strips ("scrolling color"). Based on this method is the operation, for example, of LCOS (liquid crystal on silicon) displays (cf. Shimizu: "Scrolling Color LCOS for HDTV Rear Projection" in SID 01 Digest of Technical Papers, vol. XXXII, pp. 1072 to 1075, 2001), as well as SCR-DMD (sequential color recapture—digital micro mirror) projection displays (cf. Dewald, Penn, Davis: "Sequential Color Recapture and Dynamic Filtering: A Method of Scrolling Colour" in SID 01 Digest of Technical Papers, vol. XXXII, pp. 1076 to 1079, 2001).

These systems comprise a color separation or color filtering and a modulator for the color components between the light source and the display so as to generate light in the three primary colors. The color separation and the modulator may be mutually integrated to a more or less high degree. Thus the color filtering and modulation is carried out by a rotating filter wheel in the SCR systems, whereas the color filtering in the LCOS system takes place by means of mirrors and the modulation by means of prisms. It is common to all systems, however, that the modulation causes considerable brightness fluctuations in the optical system. Furthermore, the sensitivity of usual sensors to the various color components is also strongly different. The fluctuations in the output signal of the sensor caused thereby render this signal useless as a basis for lamp control.

Added to this is that the sensor must receive a signal which is exactly proportional to the luminous flux incident on the display so as to render possible a correct control. This is not guaranteed for positions of the sensor outside the main beam path of the light and before the optical integration.

DE 101 36 474.1, for example, discloses an electronic circuit for operating a HID or UHP lamp which comprises a lamp driver for making available a controlled lamp current for the lamp and a brightness sensor for generating a sensor signal which represents the luminous flux provided by the lamp. Furthermore, a high-pass or band-pass filter is provided which filters the sensor signal and then provides it to the lamp driver for controlling the lamp current.

The object of the high-pass or band-pass filter is to separate long-term changes in the luminous flux provided by the lamp, in particular a drop as lamp life progresses, from the short-term fluctuations caused by an arc jump, such that only the latter fluctuations are used for an active control of the lamp power by means of the lamp driver.

Such an active control (LOC—light output control), however, cannot operate reliably if the sensor signal is affected by superimposed interference components which, as was explained above, are caused, for example, by the brightness fluctuations arising from a color modulator.

It is accordingly an object of the invention to provide a projection system of the kind mentioned above in which impairments of the image quality caused by an unwanted change in the luminous flux provided by the light source are at least substantially avoided, also in the presence of brightness fluctuations generated by an optical component of the projection system.

The invention in particular has for its object to provide a projection system comprising at least one high-pressure gas discharge lamp, wherein impairments of the image quality caused by fluctuations in the generated luminous flux are at least substantially avoided, in particular those caused by an unstable arc discharge, also with the use of a time-sequential color display.

Finally, the invention also has for its object to provide a projection system with time-sequential color representation in which color artifacts caused by an unwanted change in the luminous flux provided by the light source are at least substantially avoided, in particular if the light source used is formed by one or several AC-operated high-pressure gas discharge lamps.

The object is achieved, according to one embodiment, by means of a projection system for image representation with a display, at least one lamp, and at least one sensor for generating a sensor signal for the detection and compensation of changes in the luminous flux provided by said at least one lamp, as well as with an optical component arranged in a light path between the lamp and the display, which optical component allows a first light component to pass through and reflects a second light component, such that one of said light components is directed at the display and the other light component is directed at the sensor arranged outside the light path.

A particular advantage of this solution is that the sensor is not present in the light path of the projection system and thus causes no observable interferences or shadow effects, i.e. light losses. Furthermore, one of the optical components present anyway can generally be used, behind which the sensor can be mounted with a comparative low expenditure. Furthermore, the sensor signal is to a high degree proportional to the light quantity actually incident on the display, averaged over time, and not to the light quantity provided by the lamp, which may be influenced by the optical integration and other components of the system.

Further embodiments include an optical component, such as a dichroic mirror, providing an advantage that on the one hand a very high degree of reflection of more than 90% can be achieved, similar to metallic mirrors, but that on the other hand the remaining proportion of a few percents is not absorbed, unlike in metallic mirrors, but passes through the dichroic mirror and can be used for monitoring by the sensor. In this manner the illumination of the sensor does not lead to light losses in the projection system.

Another embodiment projects a sharp image of the light field on the sensor, thus rendering possible an even more exact detection of the light quantity actually focused on the display.

Yet another embodiment is capable of keeping any stray light components present in the system away from the sensor even more satisfactorily. A further embodiment includes a color projection system, for example.

Further details, features, and advantages of the invention will become apparent from the ensuing description of preferred embodiments, which is given with reference to the drawing, in which.

In the embodiment described below, the brightness of an image represented on the projection display is controlled through changing of the lamp current by means of a lamp driver that is influenced by the sensor signal. Alternatively or in addition thereto, however, it is also possible to change the brightness of the image by means of an optical filter that can be electrically controlled by the sensor signal and that is additionally provided in the radiation path between the lamp and the display, and/or a gray level mask in the form of a factor by which the brightness of the image representation on the display is multiplied in dependence on the sensor signal. These two alternative brightness controls, which are particularly suitable for the very fast displays used in the DLP systems, are described in detail in DE 102 20 510.8. This publication is to be regarded as included in the present disclosure by reference, so that it need not be discussed in detail any more below.

The invention will now be described below with reference to a projection system operating by the second method mentioned above (scrolling color system) and comprising a LCOS display. The construction and manner of operation of such a projection system are discussed in detail in the cited article by Shimizu: "Scrolling Color LCOS for HDTV Rear Projection" in SID 01 Digest of Technical Papers, vol. XXXII, pp. 1072 to 1075, 2001. This article is to be regarded as part of the present disclosure by reference.

Figure 1:
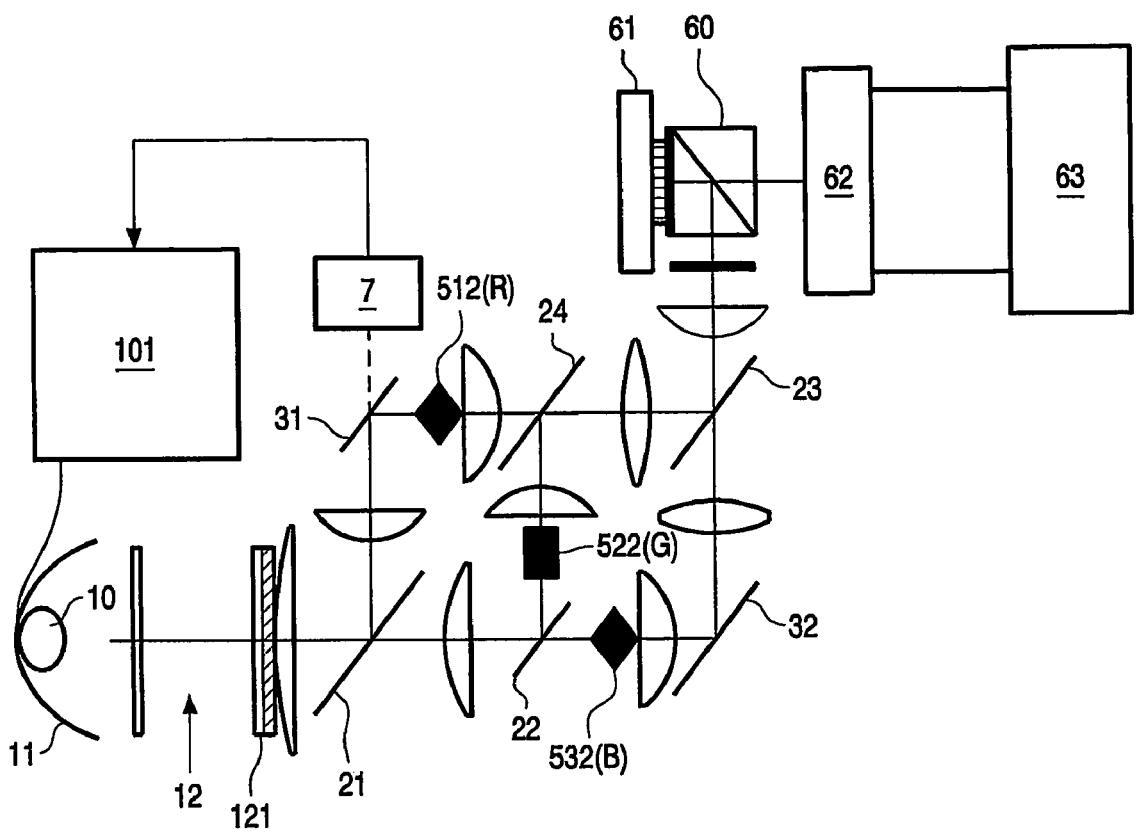
FIG. 1 shows the principle of a projection system.

Such a projection system is diagrammatically shown in FIG. 1. A light source here comprises one or several high-pressure gas discharge lamps 10 and one or several reflectors 11 which direct a light cone onto an entry surface of a light integrator 12.

The light integrator comprises an integrating optical system in known manner, at whose outlet surface a light beam with a substantially homogeneous distribution of the luminous intensity over its cross-section is generated. Diaphragm elements 121 are also provided, if applicable, so as to adapt the shape of the cross-sectional surface area substantially to the shape of an LCD display 61, so that the latter can be homogeneously illuminated.

The optical system for color separation adjoining the light integrator 12 comprises four dichroically reflecting and transmitting mirrors 21, 22, 23, 24, two deflection mirrors 31, 32, and eight lenses.

In particular, the white light generated by the lamp 10 and provided at the outlet of the light integrator 12 is split up by the dichroically reflecting and transmitting mirrors 21, 22, 23, 24 into a red, a green, and a blue component, which components are directed into a red, a green, and a blue color channel R, G, B, respectively. Each color channel comprises a rotating prism 512, 522, 532 with a diaphragm element 511 arranged in front thereof. The diaphragm elements each have a slit at which the red, green, or blue light, whichever is applicable, is directed with the cross-sectional surface area generated by the light integrator 12 which is slightly larger than the surface area of the slit.

The slit surfaces are sharply imaged (focused) on the display 61 in the form of a color beam or color strip each time by means of the respective prisms 512, 522, 532 and the lenses. The color channels are for this purpose combined again and aimed at a polarizing beam splitter (PBS) 60. This beam splitter 60 serves to illuminate the (reflecting) LCD display 61 from which the image is projected onto a picture screen 63 or a projection screen or a similar component by means of an optical projection system 62. The three color beams or color strips are consecutively moved over the display 61 in the manner explained above through rotation of the prisms 512, 522, 532 (scrolling color system).

Figure 2:
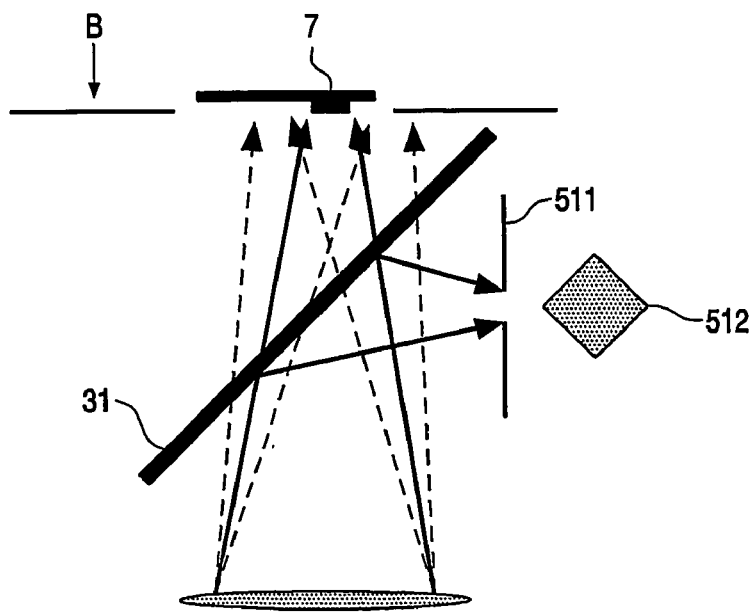
FIG. 2 shows a first sensor arrangement.

FIG. 2 shows a portion of one of the color channels. This Figure shows the deflection mirror 31 on which the light beam (for example the red light component) reflected against the first dichroically reflecting mirror 21 is incident. This light beam is reflected at the deflection mirror 31 and directed at the slit of the diaphragm element 511 in front of the rotating prism 512.

The deflection mirror 31 preferably also is a dichroic mirror which is dimensioned such that it reflects a highest possible proportion of the incident light (i.e. more than 90%), allowing the remainder to pass through. Such a deflection mirror may be manufactured, for example, from glass with a suitable dichroic coating. Alternatively, a deflection mirror may be used which transmits only light in a wavelength range outside the visible spectrum, or the two properties are combined with one another.

The light component transmitted by the deflection mirror 31 is detected by a sensor 7. The output signal of the sensor 7 is supplied to a lamp driver 101 which supplies the lamp 10 with a supply current, and serves to control this lamp driver 101 such that fluctuations in the luminous flux provided by the lamp 10 are compensated by a suitable control of the supply current.

This arrangement combines two essential advantages. On the one hand, influences of the light actually directed to the display 61 cannot be observed by the sensor 7, because it is not present in the light path of the projection system, and the light component passing through the dichroic deflection mirror 31 (essentially the light component absorbed in the metal layer of a conventional metal deflection mirror) is either very small and/or lies outside the visible spectrum of the light.

On the other hand, the sensor signal is not influenced by brightness fluctuations in the color channels R, G, B or stray light originating from the rotating prisms 512, 522, 532 or other optical components, because these essentially back-reflected components cannot reach the sensor 7 through the deflection mirror 31, or at least only in a negligibly small quantity.

The positioning and distancing of the sensor 7 with respect to the deflection mirror 31 is achieved, according to FIG. 2, such that the sensor lies in an imaging or focusing plane (B) of the color strip focused on the display 61. To achieve this, the distance of the sensor 7 from the deflection mirror 31 is, for example, exactly as great as the distance of the slit surface (which is focused on the display) in the diaphragm element 511 from the deflection mirror 31. This positioning is shown in FIG. 2.

Alternatively, the sensor 7 may lie in the focusing plane of the display 61 if a combination of lenses is arranged between the deflection mirror 31 and the sensor 7 such as the one present between the deflection mirror 31 and the display 61.

Both cases lead to the advantage that a (sharp) image of the light field actually also reaching the display 61 is incident on the sensor 7, so that fluctuations in the luminous intensity on the display can be monitored even more precisely. In addition, essentially only the useful light component, and no scattered light (shown in broken lines), is incident on the sensor 7 in the arrangement of FIG. 2.

Figure 3:
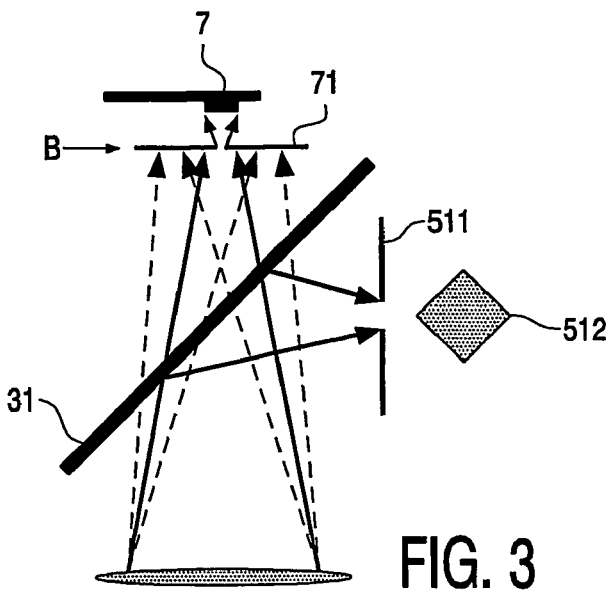
FIG. 3 shows a second sensor arrangement.

A second sensor arrangement and a portion of the corresponding color channel is diagrammatically shown in FIG. 3. The light beam hits the deflection mirror 31 again in the same manner as in FIG. 2, and is directed from there to the slit of the diaphragm element 511, behind which the rotating prism 512 is positioned.

In contrast to the embodiment of FIG. 2, the light passing through the deflection mirror 31 is here incident on a diaphragm element 71 with a slotted opening lying in the imaging or focusing plane B, behind which opening the sensor 7 is present. Any stray light components in the projection system can be kept away from the sensor even better in this manner.

Figure 4:
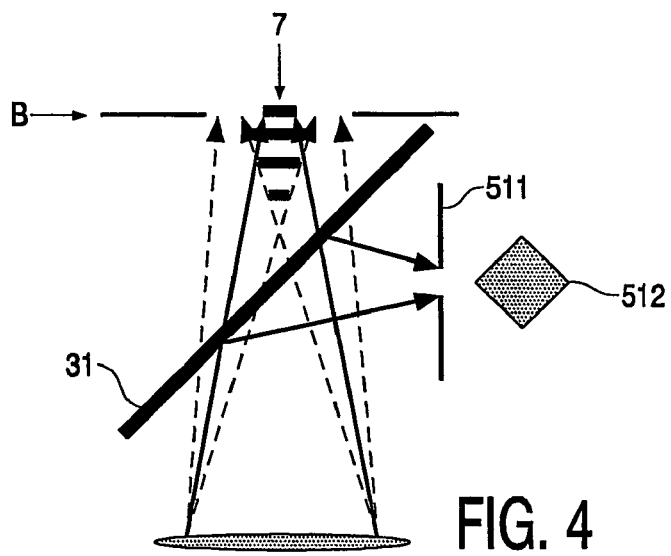
FIG. 4 shows further possible sensor arrangements.

FIG. 4 shows further positions of the sensor 7 for a color channel as shown in FIGS. 2 and 3, which positions lie one behind the other in the direction of propagation of the light transmitted by the deflection mirror 31. These positions may be chosen, for example, in accordance with the size of the sensor surface, the strength of the stray light, and/or the spatial conditions in a given projection system. It should only be taken into account here that, as the distance of the sensor 7 from the imaging or focusing plane B increases, the deviation between the luminous intensity hitting the sensor 7 and the luminous intensity actually reaching the display 61 becomes greater, and thus the error of the sensor signal.

Given the numerous possibilities for the sensor positioning, it may be assumed that a suitable position for a sensor can be found in substantially each and every existing projection system, where this sensor can be mounted without any major expenditure so as to monitor a light component in the manner described.

Figure 5:
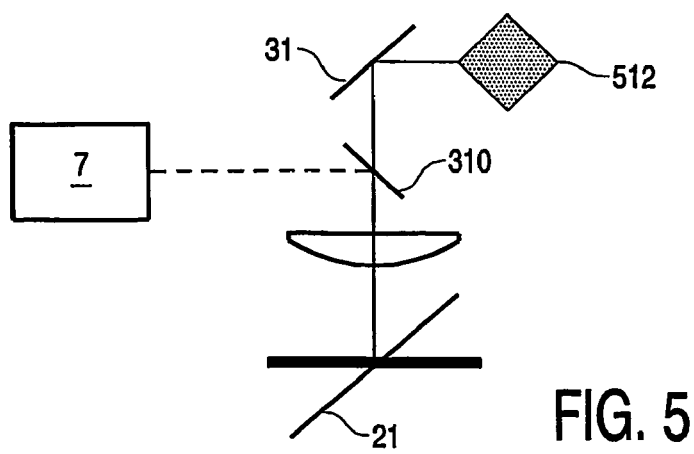
FIG. 5 shows part of a color channel of the projection system.

Instead of a deflection mirror 31 which is present and coated as explained above, it is alternatively possible according to FIG. 5 to introduce an additional optical component 310 in the radiation path, by means of which a small portion of the light is separated and directed at the suitably arranged sensor 7, such that the optical component 310 allows as large as possible a light component to pass uninterfered with. Such a component may be, for example, a simple glass disc, which may have to be deflectorized in some cases so as not to reflect too much light onto the sensor.

The deflection mirror 31 in this case is preferably a metal mirror, as is usual. This embodiment corresponds to the configuration shown in FIG. 1 in other respects.

There is also the possibility, finally, of obtaining the light component directed at the sensor 7 through reflection at an optical component of the system shown in FIG. 1 which is present anyway.

The invention claimed is:

1. A projection system for image representation comprising:
    a display,
    at least one lamp,
    at least one sensor for generating a sensor signal for detection and compensation of changes in a luminous flux provided by said at least one lamp, and
    an optical component arranged in a light path between the lamp and the display,
    wherein the optical component is configured to allow a first light component to pass through and reflects a second light component, such that one of said light components is directed at the display and the other light component is directed at the sensor arranged outside the light path, and
    wherein the sensor is arranged behind a diaphragm element which lies in an imaging or focusing plane of a light component focused onto the display.

2. The projection system as claimed in claim 1, wherein the optical component is a deflection mirror.

3. The projection system as claimed in claim 2, wherein the deflection mirror is a dichroic mirror with a high reflectivity and a low transmissivity, and the sensor detects the light component transmitted by said dichroic mirror.

4. The projection system as claimed in claim 1, wherein the sensor is arranged such that it lies in an imaging or focusing plane of a light component focused onto the display.

5. A projection system for representation of color images through time-sequential projection of color strips onto display comprising:
    at least one lamp,
    at least one sensor for generating a sensor signal for the detection and compensation of changes in a luminous flux provided by said at least one lamp, and
    an optical component arranged in a light path between the lamp and the display,
    wherein the optical component is configured to allow a first light component to pass through and reflects a second light component, such that one of said light components is directed at the display and the other light component is directed at the at least one sensor arranged outside the light path, and
    an optical system for color separation, wherein the optical component is a dichroically coated deflection mirror in one of the color channels.

6. The projection system of claim 5, wherein the dichroic mirror has a high reflectivity and a low transmissivity, and the at least one sensor detects the light component transmitted by said dichroic mirror.

7. The projection system of claim 5, wherein the at least one sensor is arranged such that it lies in an imaging or focusing plane of a light component focused onto the display.

8. A projection system comprising:
    a display;
    a lamp;
    a sensor configured to generate a sensor signal for the detection and compensation of changes in a luminous flux provided by the lamp, the sensor being arranged behind a diaphragm element which lies in an imaging or focusing plane of a light component focused onto the display; and an optical component arranged in a light path between the lamp and the display, wherein the optical component is configured to allow a first light component to pass through and reflects a second light component, such that one of said light components is directed at the display and the other light component is directed at the sensor.

9. The projection system of claim 8, wherein the sensor is arranged outside the light path.

10. The projection system of claim 8, wherein the optical component is a deflection mirror.

11. The projection system of claim 10, wherein the deflection mirror is a dichroic mirror with a high reflectivity and a low transmissivity, and the sensor is configured to detect the light component transmitted by said dichroic mirror.

12. The projection system of claim 8, wherein the sensor lies in an imaging or focusing plane of a light component focused onto the display.

* * * * *